United States Patent
Choi

(10) Patent No.: US 11,275,549 B2
(45) Date of Patent: Mar. 15, 2022

(54) DISPLAY APPARATUS AND CONTROL METHOD THEREOF

(71) Applicant: SAMSUNG ELECTRONICS CO., LTD., Suwon-si (KR)

(72) Inventor: Youngho Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 17/084,322

(22) Filed: Oct. 29, 2020

(65) Prior Publication Data

US 2021/0132892 A1    May 6, 2021

(30) Foreign Application Priority Data

Nov. 4, 2019    (KR) .................. 10-2019-0139473

(51) Int. Cl.
*G09G 3/30* (2006.01)
*G09G 3/36* (2006.01)
(Continued)

(52) U.S. Cl.
CPC ............ *G06F 3/1446* (2013.01); *H02J 50/05* (2016.02); *H04B 10/50* (2013.01); *H04B 10/60* (2013.01);
(Continued)

(58) Field of Classification Search
CPC ........ G06F 3/1446; H02J 50/05; H04B 10/50; H04B 10/60; G09G 3/32; G09G 2300/026; G09G 2330/02; G09G 2370/18
See application file for complete search history.

(56) References Cited

U.S. PATENT DOCUMENTS 9,653,911 B1     5/2017  Kim et al.
9,877,406 B2 *   1/2018  Hochman ............ H05K 7/1401
(Continued)

FOREIGN PATENT DOCUMENTS

EP    3 065 284 A1    9/2016
EP    3 379 521 A1    9/2018
(Continued)

OTHER PUBLICATIONS

Communication dated Mar. 2, 2021 issued by the European Patent Office in European Application No. 20204020.0.
(Continued)

*Primary Examiner* — Sanghyuk Park
(74) *Attorney, Agent, or Firm* — Sughrue Mion, PLLC

(57) ABSTRACT

A display apparatus is provided. The display apparatus includes a plurality of display modules, each of the plurality of display modules including a first electrode plate provided on a back surface of the display module; a frame including a plurality of areas to which the plurality of display modules are respectively mounted; a power supply module including a second electrode plate, the second electrode plate being disposed on a back surface of the frame and adjacent to the first electrode plate. The power supply module is configured to provide an alternating current (AC) power received from an external apparatus to each of the plurality of display modules, and each of the plurality of display modules is configured to convert the AC power to a direct current (DC) power.

20 Claims, 10 Drawing Sheets

(51) Int. Cl.
  *G06F 3/14* (2006.01)
  *H02J 50/05* (2016.01)
  *H04B 10/50* (2013.01)
  *H04B 10/60* (2013.01)
  *G09G 3/32* (2016.01)

(52) U.S. Cl.
  CPC ......... *G09G 3/32* (2013.01); *G09G 2300/026* (2013.01); *G09G 2330/02* (2013.01); *G09G 2370/18* (2013.01)

(56) References Cited

U.S. PATENT DOCUMENTS

| | | |
|---|---|---|
| 9,921,794 B2 | 3/2018 | Lee et al. |
| 9,935,487 B2 | 4/2018 | Shibata et al. |
| 2002/0071247 A1 | 6/2002 | Clark et al. |
| 2009/0009103 A1 | 1/2009 | McKechnie et al. |
| 2009/0146931 A1 | 6/2009 | Kharrati et al. |
| 2012/0038619 A1* | 2/2012 | Shraga .................. H02J 50/402 345/212 |
| 2015/0154905 A1 | 6/2015 | Takanohashi et al. |
| 2016/0019831 A1 | 1/2016 | Hall |
| 2016/0041805 A1* | 2/2016 | Joo ....................... G06F 3/1446 345/205 |
| 2016/0224306 A1 | 8/2016 | Ryeyna, III et al. |

FOREIGN PATENT DOCUMENTS

| | | |
|---|---|---|
| JP | 2011-257540 A | 12/2011 |
| JP | 6004122 B2 | 10/2016 |
| KR | 10-2000-0051290 A | 8/2000 |
| KR | 10-0597079 B1 | 7/2006 |
| KR | 10-1427368 B1 | 8/2014 |
| KR | 10-2017-0015592 A | 2/2017 |
| KR | 10-2017-0024763 A | 3/2017 |
| KR | 10-2017-0114836 A | 10/2017 |
| KR | 10-2017-0135394 A | 12/2017 |
| KR | 10-1873866 B1 | 7/2018 |
| KR | 10-1881658 B1 | 7/2018 |
| KR | 10-2019-0123703 A | 11/2019 |
| WO | 2014/125392 A1 | 8/2014 |
| WO | 2018206329 A1 | 11/2018 |
| WO | 2019034975 A1 | 2/2019 |

OTHER PUBLICATIONS

International Search Report (PCT/ISA/210) dated Feb. 10, 2021 issued by the International Searching Authority in International Application No. PCT/KR2020/014678.
Written Opinion (PCT/ISA/237) dated Feb. 10, 2021 issued by the International Searching Authority in International Application No. PCT/KR2020/014678.
Communication dated Jun. 30, 2021 issued by the European Patent Office in European Application No. 20204020.0.

* cited by examiner

DISPLAY APPARATUS AND CONTROL METHOD THEREOF

CROSS-REFERENCE TO RELATED APPLICATION

This application is based on and claims priority under 35 U.S.C. § 119 to Korean Patent Application No. 10-2019-0139473, filed on Nov. 4, 2019, in the Korean Intellectual Property Office, the disclosure of which is incorporated by reference herein in its entirety.

BACKGROUND

1. Field

The disclosure relate to an electronic apparatus and a control method thereof, and more specifically, to a display apparatus including a plurality of display modules and a control method thereof.

2. Description of Related Art

Display apparatuses of various types are provided with the development of electronic technologies, and there is a growing demand for large-scale display apparatuses.

In particular, a modular display apparatus may implement a large-scale display apparatus by interconnecting a plurality of display modules. The modular display apparatus requires power lines and data signal lines for the plurality of display modules. However, if the number of display modules to be interconnected increases to implement a greater size of a modular display apparatus, it may occur problems such as a reduced yield, increased defects, and the like in a process of manufacturing and assembling the modular display apparatus.

Accordingly, the modular display apparatus assembly process is complex and much difficult to connect the display modules provided within the display apparatus, and a manufacturing cost increases.

SUMMARY

Provided are a display apparatus that stably supplies power and a signal to each of a plurality of modules included in the display apparatus and a control method thereof.

Additional aspects will be set forth in part in the description which follows and, in part, will be apparent from the description, or may be learned by practice of the presented embodiments.

According to an aspect of the disclosure, there is provided a display apparatus, including: a plurality of display modules, each of the plurality of display modules including a first electrode plate provided on a back surface of the display module; a frame including a plurality of areas to which the plurality of display modules are respectively mounted; a power supply module including a second electrode plate, the second electrode plate being disposed on a back surface of the frame and adjacent to the first electrode plate, wherein the power supply module is configured to provide an alternating current (AC) power received from an external apparatus to each of the plurality of display modules, and wherein each of the plurality of display modules is configured to convert the AC power to a direct current (DC) power.

Each of the plurality of display modules may further include: a variable inductor; a switch connected to the variable inductor; and a processor configured to control an on/off of the switch to adjust an inductance of the variable inductor based on a capacitance caused by a contact between the first electrode plate and the second electrode plate.

The first electrode plate may include a first positive electrode plate and a first negative electrode plate, and the second electrode plate may include a second positive electrode plate and a second negative electrode plate, the second positive electrode plate contacting the first positive electrode plate and the second negative electrode plate contacting the first negative electrode plate.

The power supply module may have a size corresponding to a size of the frame.

The display apparatus may further include: a light transmitting module configured to convert a signal received from the external apparatus to an optical signal and transmits the optical signal to the plurality of display modules, wherein each of the plurality of areas includes at least one first hole provided on a first side of each of the plurality of areas and at least one second hole provided on a second side of each of the plurality of areas, the second side facing the first side.

Each of the plurality of display modules may include an optical signal receiver provided at a position corresponding to the at least one first hole and an optical signal transmitter provided at a position corresponding to the at least one second hole; and a first display module of the plurality of display modules may be configured to, based on receiving light, transmitted from the light transmitting module through the optical signal receiver via the at least one first hole, transmit the received light to a second display module, adjacent to the first display module, through the optical signal transmitter via the at least one second hole.

The plurality of display modules may be disposed in a matrix form, the plurality of display modules including a first display module, a second display module, and a third display module disposed adjacent to one another in a same row or a same column in the matrix form, and the second display module may be configured to, based on receiving light, transmitted from the first display module via the at least one first hole, transmit the received light to the third display module via the at least one second hole.

The frame may further include: a light guide hole passing through an area of the frame between the at least one second hole provided in an area of the frame corresponding to the first display module and the at least one first hole provided in an area of the frame corresponding to the second display module, and the second display module may be further configured to receive the light transmitted from the first display module through the light guide hole.

The plurality of display modules may be divided into a plurality of display groups; display modules included in a same display group may be interconnected to each other through a light guide hole; and the plurality of display groups may receive a plurality of optical signals from a light transmitting module through a plurality of light guide holes provided between the plurality of display groups and the light transmitting module.

The plurality of display modules may be interconnected to each other by a cable, and each of the plurality of display modules may be further configured to transmit a signal received from the external apparatus to an adjacent display module via the cable.

According to an aspect of the disclosure, there is provided a method of controlling a display apparatus, the display apparatus including a plurality of display modules and a power supply module configured to provide power to each of the plurality of display modules, the method including: providing, by the power supply module, an alternating current (AC) power received from an external apparatus to each of the plurality of display modules via a first electrode plate provided on a back surface of each of the plurality of display modules and a second electrode plate disposed on a back surface of a frame of the display apparatus and adjacent to the first electrode plate, wherein the frame includes a plurality of areas to which the plurality of display modules are respectively mounted; and converting, by each of the plurality of display modules, the AC power to a direct current (DC) power.

Each of the plurality of display modules may include a variable inductor, and a switch connected to the variable inductor, the method further including controlling an on/off of the switch such that an inductance of the variable inductor corresponds to a capacitance according to a contact between the first electrode plate and the second electrode plate.

The first electrode plate may include a first positive electrode plate and a first negative electrode plate, and the second electrode plate may include a second positive electrode plate and a second negative electrode plate, the second positive electrode plate contacting the first positive electrode plate and the second negative electrode plate contacting the first negative electrode plate.

The power supply module may have a size corresponding to a size of the frame.

The method may further include converting, by using a light transmitting module of the display apparatus, a signal received from the external apparatus to an optical signal and transmitting the optical signal to the plurality of display modules.

The method may further include: receiving, by a first display module of the plurality of display modules, light transmitted from the light transmitting module through an optical signal receiver of the first display module via at least one first hole provided on a first side of an area of the frame to which the first display module is mounted; and transmitting, by the first display module, the received light to a second display module, adjacent to the first display module, through an optical signal transmitter of the first display module via at least one second hole provided on a second side of the area of the frame to which the first display module is mounted, the second side facing the first side.

The light transmitting module may be connected to one side of the power supply module.

The plurality of display modules may include a first display module, a second display module, and a third display module disposed adjacent to one another in a same row or a same column, the method further including: receiving, by the second display module, light transmitted from the first display module via at least one first hole provided on a first side of an area of the frame to which the second display module is mounted; and transmitting, by the second display module, the received light to the third display module via at least one second hole provided on a second side of the area of the frame to which the second display module is mounted, the second side facing the first side.

The frame may further include a light guide hole passing through an area of the frame between the at least one second hole provided in an area of the frame corresponding to the second display module and at least one first hole provided in an area of the frame corresponding to the third display module, and the transmitting may include transmitting the received light to the third display module through the light guide hole.

The plurality of display modules may be divided into a plurality of display groups, and display modules included in a same display group may be interconnected to each other through a light guide hole, the method further including transmitting a plurality of optical signals from a light transmitting module to the plurality of display groups through a plurality of light guide holes provided between the plurality of display groups and the light transmitting module.

The plurality of display modules may be interconnected to each other by a cable, and each of the plurality of display modules may be further configured to transmit a signal received from the external apparatus to an adjacent display module via the cable.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
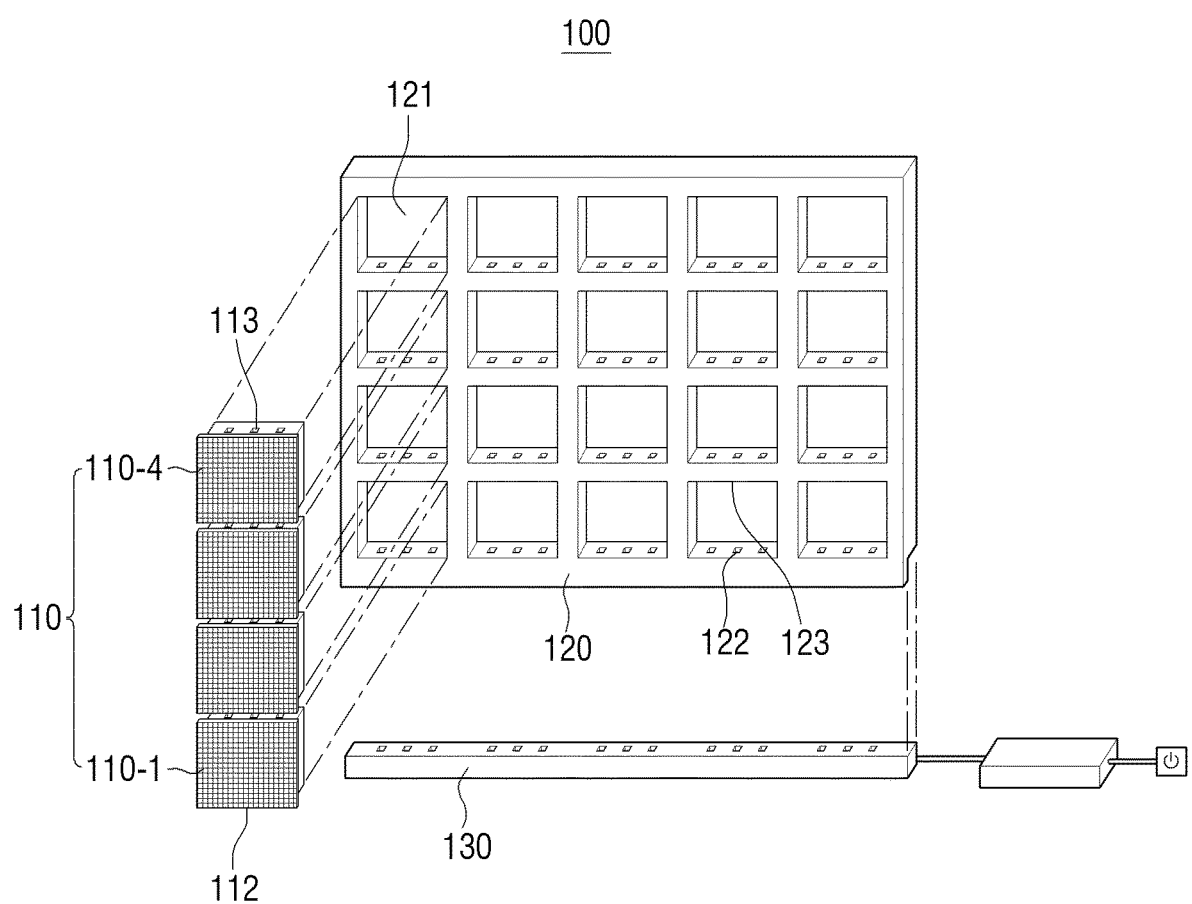
FIG. 1 is a diagram illustrating a schematic configuration of a display apparatus according to an embodiment of the disclosure.

The terms used herein will be briefly described, and the disclosure will be described in greater detail below.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

Since the embodiments of the disclosure may be variously modified, and include various embodiments therefrom, specific embodiments have been illustrated and detailed descriptions provided to assist in the comprehensive understanding thereof. However, it should be noted that various embodiments are not for limiting the scope of the disclosure to a specific embodiment, but should be interpreted to include all modifications, combinations, equivalents and/or alternatives of the embodiments. In describing the embodiments, in case it is determined that the detailed description of related known technologies may unnecessarily confuse the gist of the disclosure, the detailed description thereof will be omitted.

The terms such as "first" and "second" may be used to describe various elements, but the elements may not be limit by the terms. The terms may be used only for the purpose of distinguishing one element from another element.

A singular expression may include a plural expression, unless clearly indicated otherwise in the context. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

In the disclosure, terms such as "module" or "part" may be used to perform at least one function or operation, and may be implemented as hardware or software, or a combination of hardware and software. Further, a plurality of "modules" or a plurality of "parts" except for when the "modules" or "parts" need to be implemented to a specific hardware, may be integrated to at least one module to be implemented as at least one processor (not shown).

Embodiments of the disclosure have been described in detail with reference to the accompanying drawings to aid in the understanding of those of ordinary skill in the art. However, the disclosure may be realized in various different forms and it should be noted that the disclosure is not limited to various embodiments described herein. Further, in the drawings, parts not relevant to the description may be omitted, and like reference numerals may be used to indicate like elements.

FIG. 1 is a diagram illustrating a schematic configuration of a display apparatus according to an embodiment of the disclosure.

As illustrated in FIG. 1, a display apparatus 100 according to an embodiment may include a plurality of display modules 110, a frame 120, and a light transmitting module 130.

The display apparatus 100 may display video data. The display apparatus 100 may be implemented as a television (TV), but is not limited thereto, and may be applicable to any apparatus that includes a display function such as, for example, and without limitation, a video wall, a large format display (LFD), a digital signage, a digital information display (DID), a projector display, or the like. In addition, the display apparatus 100 may be implemented as a display of various types such as, for example, and without limitation, a liquid crystal display (LCD), an organic light-emitting diode (OLED), a liquid crystal on silicon (LCoS), a digital light processing (DLP), a quantum dot (QD) display panel, a quantum dot light-emitting diodes (QLED), a micro light-emitting diode (μLED), a mini LED, or the like.

Referring to FIG. 1, each of the plurality of display modules 110 according to an embodiment may be mounted to an area 121 provided on the frame 120. Each of a plurality of areas 121 provided on the frame 120 may be in a square shape and may include a space to which the display module 110 may be mounted and supported.

According to an embodiment, the display apparatus 100 may be implemented in a form including a plurality of display modules 110 (e.g., a display module 110-1, . . . , a display module 110-4). For example, as illustrated in FIG. 1, the plurality of display modules 110 may be combined to form the display apparatus 100. The display module 110 will be described in greater detail below with reference to FIGS. 2 to 4.

Figure 2:
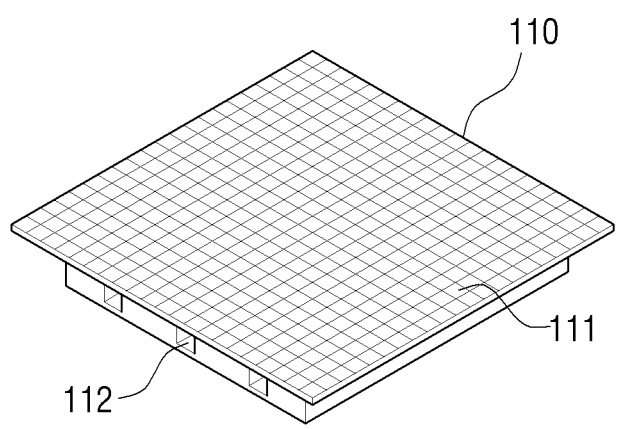
FIG. 2 is a diagram illustrating a front surface of a display module according to an embodiment of the disclosure.
Figure 3:
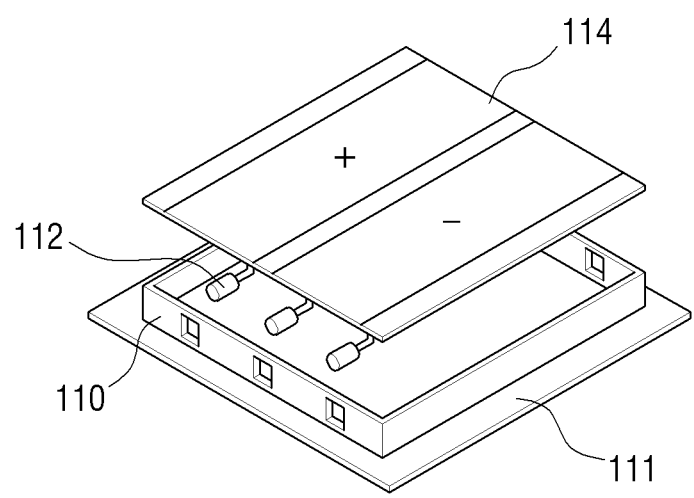
FIG. 3 is a diagram illustrating a back surface of a display module according to an embodiment of the disclosure.
Figure 4:
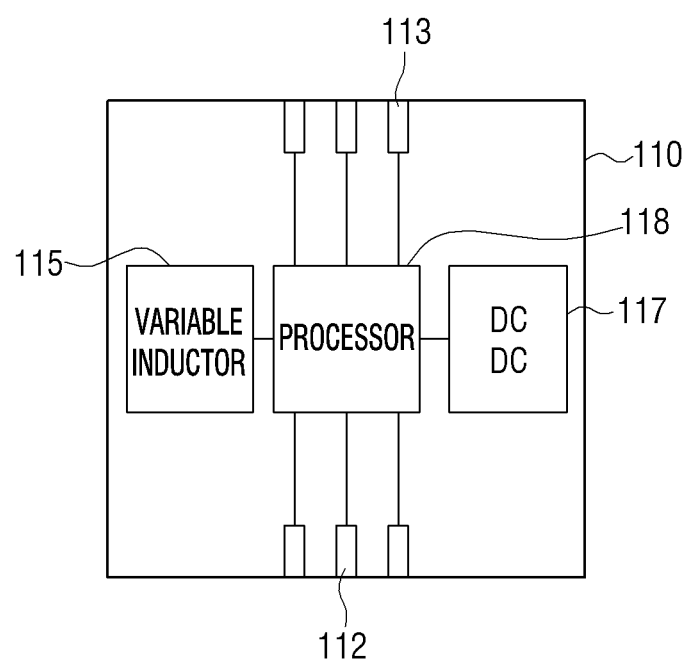
FIG. 4 is a diagram illustrating a schematic configuration of a display module according to an embodiment of the disclosure.

FIG. 2 is a diagram illustrating a front surface of a display module according to an embodiment of the disclosure. FIG. 3 is a diagram illustrating a back surface of a display module according to an embodiment of the disclosure. FIG. 4 is a diagram illustrating a configuration of a display module according to an embodiment of the disclosure.

According to an embodiment, the display module 110 may include a plurality of self-illuminant elements. The self-illuminant element may be at least one of a light emitting diode (LED) or a micro LED.

Referring to FIG. 2, each of the plurality of display modules 110 may include an LED cabinet which includes a plurality of LED elements on the front surface of the display module or an LED array 111. An LED element may be implemented as a red (R), green (G), and blue (B) LED, and the RGB LED may include a red LED, a green LED, and a blue LED. Further, the LED element may additionally include a white LED in addition to the RGB LED.

In an example, the LED element may be implemented as a micro LED. The micro LED may, as an LED of approximately 5-100 micrometer (μm) in size, be an ultra-small light emitting element that self-illuminates without a color filter.

The display module 110 may further include an optical signal receiver 112 and an optical signal transmitter 113 in addition to the LED array 111, which will be described in greater detail below with reference to FIG. 3.

FIG. 3 is a diagram illustrating a back surface of a display module according to an embodiment of the disclosure.

According to an embodiment, the display module 110 may include an optical signal receiver 112, an optical signal transmitter 113, and a first electrode plate 114.

Referring to FIG. 3, the display module 110 may include an LED array 111, a support frame which is disposed at a back surface of the LED array 111, and a driving circuit which is installed on the support frame. The support frame may comprise a square shape edge to correspond to a shape of the driving circuit and couple to the driving circuit. The driving circuit may be installed to cover the support frame and may shield the inside of the support frame.

According to an embodiment, the driving circuit may include the optical signal receiver 112 and the optical signal transmitter 113. On a first side of the support frame, a first hole may be provided for the optical signal receiver 112 to receive an optical signal without being blocked, and on a second side which faces the first side, a second hole may be provided for the optical signal transmitter 113 to transmit the optical signal without being blocked.

On a back surface of the driving circuit according to an embodiment, the first electrode plate 114 may be provided. The back surface of the driving circuit may refer to an opposite surface of circuits, a copper film surface, and the like. The first electrode plate 114 may be implemented as a thin conductive plate through which electricity may pass. For example, the first electrode plate 114 may be implemented as a copper plate.

FIG. 4 is a diagram illustrating a configuration of a display module according to an embodiment of the disclosure.

Referring to FIG. 4, the driving circuit provided in the display module 110 may further include a variable inductor 115, a switch 116, a direct current (DC) to DC converter 117, and a processor 118.

According to an embodiment, the processor 118 may include one or more of a microprocessor, a central processing unit (CPU), a micro controller unit (MCU), a micro processing unit (MPU), a controller, an application processor (AP), a communication processor (CP), or an advanced reduced instruction set computer (RISC) machine (ARM) processor, or may be defined by the corresponding term. In addition, the processor 118 may be implemented as a system on chip (SoC) having a built-in processing algorithm and as a large scale integration (LSI), or in a field programmable gate array (FPGA) form.

The first electrode plate 114, the variable inductor 115, the switch 116, and the DC-to-DC converter 117 will be described in detail below with reference to FIGS. 5 to 8.

The detailed description on receiving and transmitting an optical signal corresponding to the video data according to an embodiment will be provided below with reference to FIG. 9.

Figure 5:
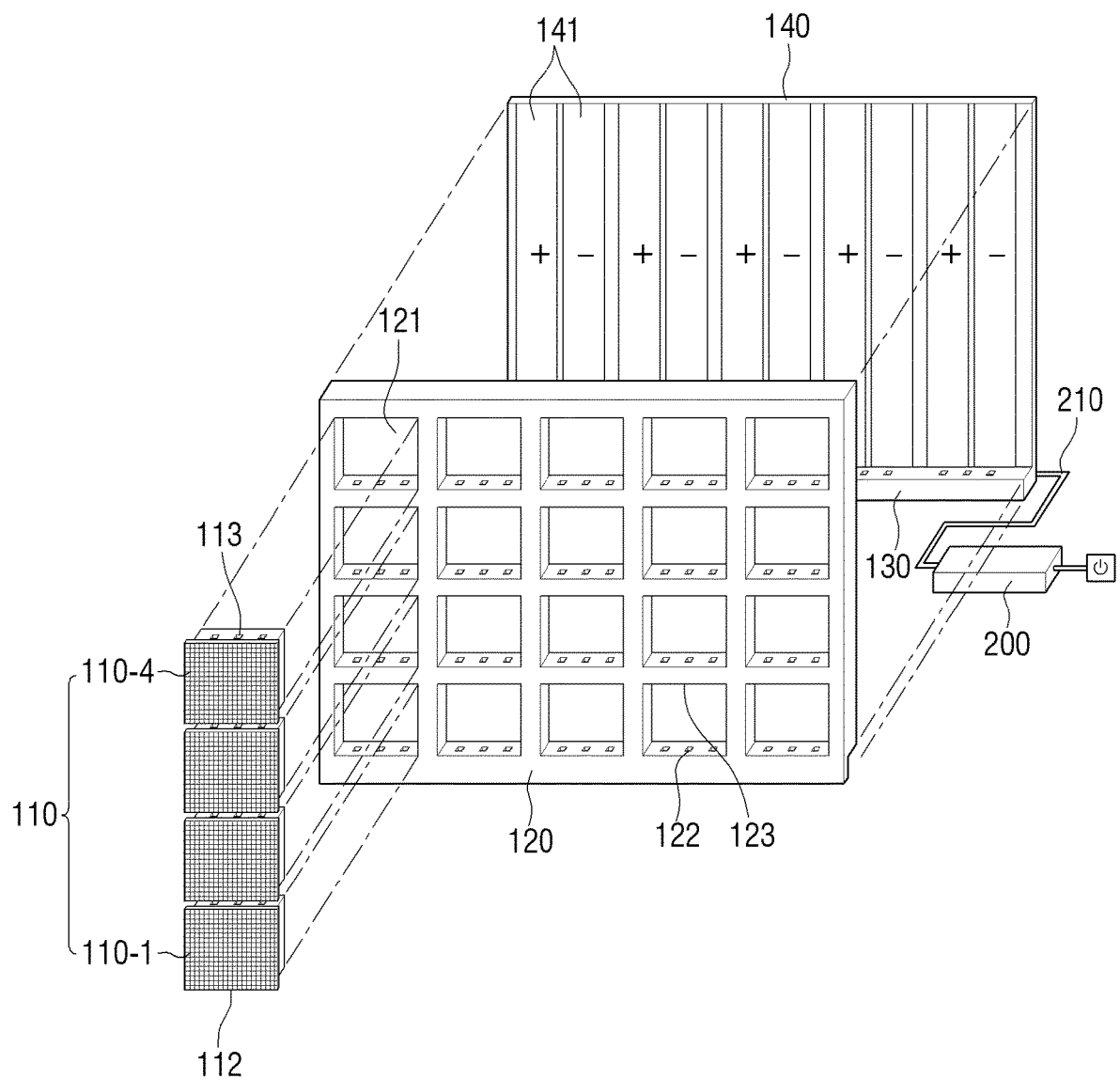
FIG. 5 is a diagram illustrating a schematic configuration of a display apparatus according to an embodiment of the disclosure.

FIG. 5 is a diagram illustrating a schematic configuration of a display apparatus according to an embodiment of the disclosure.

Referring to FIG. 5, the display apparatus 100 according to an embodiment may further include a power supply module 140. Further, referring to FIG. 5, similar to an embodiment of FIG. 1, each of the plurality of display modules 110 according to an embodiment may be mounted to an area 121 provided on a frame 120. Each of a plurality of areas 121 provided on the frame 120 may be in a square shape and may include a space to which the display module 110 may be mounted and supported. The size of each of the plurality of areas 121 provided in the frame 120 according to an embodiment may correspond to the size of the support frame provided in the display module 110.

The power supply module 140 may supply alternating current (AC) power received from an external apparatus 200 to each of the plurality of display modules 110.

According to an embodiment, the power supply module 140 may be disposed on the back surface of the frame 120. In addition, the power supply module 140 may include a second electrode plate 141, and the second electrode plate 141 may be in contact with the first electrode plate 114 which is provided on the back surface of the display module 110. The second electrode plate 141 may be implemented as a thin conductive plate through which electricity may pass. For example, the second electrode plate 141 may be implemented as a copper plate. In an example, the second electrode plate 141 of the power supply module 140 may include a plurality of second electrode plates 141, including a plurality of positive electrode plates and a plurality of negative electrode plates which may be alternately disposed. For example, the power supply module 140 may include the second electrode plate 141 which is disposed such that one positive electrode plate and one negative electrode plate contact each other in each of a plurality of display groups. The plurality of display groups of the display modules 110 will be described later.

The first electrode plate 114 provided in each of the plurality of display modules 110 within a display group may include a first positive electrode plate and a first negative electrode plate. Each of the first positive electrode plate and the first negative electrode plate included in the first electrode plate 114 of the display module 110 may be in contact with the second positive electrode plate and the second negative electrode plate provided on the corresponding second electrode plate 141 of the power supply module 140.

The display apparatus 100 may further include an insulating paper for electrically insulating between the first electrode plate 114 and the second electrode plate 141 or a film paper of high permittivity. According to an embodiment, the display apparatus 100 may apply high alternating voltages between the first electrode plate 114 and the second electrode plate 141, and transfer power to each of the plurality of display modules 110 by an electric field.

According to an embodiment, the power supply module 140 may be provided in a size corresponding to the size of the frame 120. For example, the size of the power supply module 140 may be consistent with the size of the frame 120 when if the power supply module 140 is disposed at the rear surface of the frame 120. In addition, the light transmitting module 130 may be connected to one side of the power supply module 140.

Each of the plurality of display modules 110 according to an embodiment may convert the received AC power to DC power and drive an internal element, the LED array 111, and the like, which will be described in greater detail with reference to FIG. 6.

Various embodiments on the display apparatus 100 that provide power wirelessly to each of the plurality of display modules 110 through the power supply module 140 will be described below.

Figure 6:
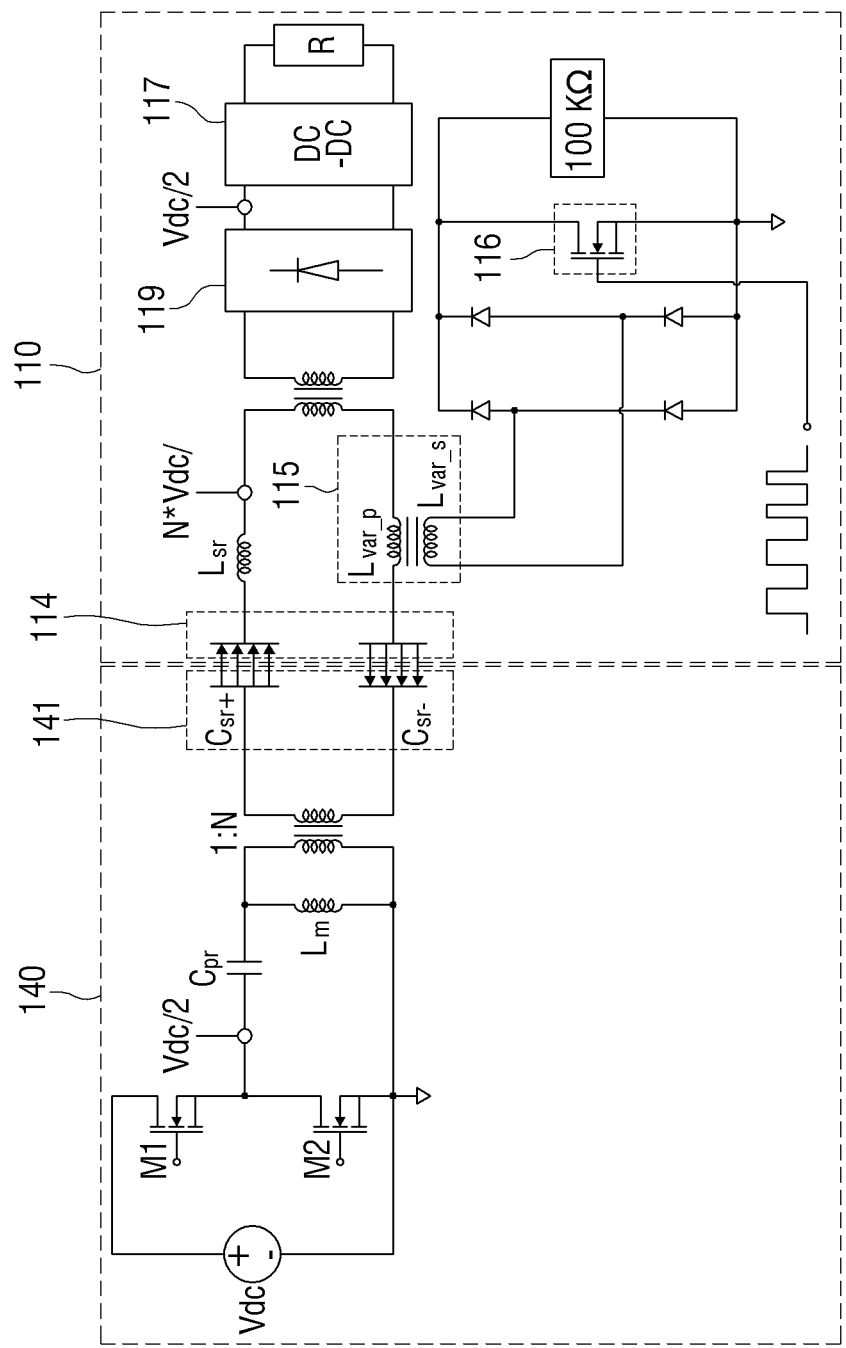
FIG. 6 is a circuit diagram illustrating a display module and a power supply module according to an embodiment of the disclosure.

FIG. 6 is a circuit diagram illustrating a display module and a power supply module according to an embodiment of the disclosure.

Referring to FIG. 6, a circuit represented by a left side dotted are of the drawing may be a circuit included in the power supply module 140, and a circuit represented by a right side dotted are of the drawing may be a circuit included in each of the plurality of display modules 110.

The power supply module 140 may receive AC power from the external apparatus 200. For example, the power supply module 140 may receive high voltage AC power of 350 V from the external apparatus 200. Because the power supply module 140 receives AC power of a high voltage, low current flows in a cable connecting the power supply module 140 and the external apparatus 200, and the cable may be implemented as a very thin line 210 (see FIG. 5). However, the embodiment is not limited thereto, and the power line of the power supply module 140 may also be directly connected to a power outlet which provides commercial use power (e.g., 90 V to 264 V). The thin line 210 include a very thin power line and a signal line capable of sending signals using the power line.

The second electrode plate 141 of the power supply module 140 and the first electrode plate 114 of the display module 110 may contact each other, and the power supply module 140 may apply AC power of a high voltage between the first electrode plate 114 and the second electrode plate 141. Accordingly, the display module 110 may receive electromagnetic energy.

Then, each of the plurality of display modules 110 may convert the AC power to DC power. As illustrated in FIG. 6, the display module 110 may include a variable inductor 115, a switch 116, a DC-to-DC converter 117 and a rectifier 119.

Referring back to FIG. 6, each of the plurality of display modules 110 may rectify the AC power, that is, an electromagnetic energy, which is received through the first electrode plate via the rectifier 119. For example, the rectifier 119 may rectify and smooth the received AC power and generate the DC power.

Then, the DC-to-DC converter 117 may convert the power rectified in the rectifier 119 to a predetermined intensity. In an example, the DC-to-DC converter 117 may adjust the DC power to a direct current voltage level (e.g., 3 V to 10 V) suitable for controlling the emission of light of a plurality of light emitting elements included in the LED array 111. However, this is merely one example, and the DC-to-DC converter 117 may adjust and output the DC power to any voltage level appropriate for driving the display module 110.

Each of the plurality of display modules 110 may include a plurality of elements for converting the high DC voltage to a low DC voltage, or may not include a high volume DC-to-DC converter. Because the power supply module 140 according to various embodiments alternately transfers high voltage to each of the plurality of display modules 110, each of the plurality of display modules 110 may use a transformer to convert the AC power of a high voltage to the AC power of a low voltage. Then, each of the plurality of display modules 110 may use the rectifier 119 of a relatively simple and small size and the DC-to-DC converter 117 to convert the AC power of a low voltage to a DC power of a low voltage.

The first electrode plate 114 and the second electrode plate 141 according to an embodiment may be described as being disposed to be in contact with each other, but the embodiment is not limited thereto. For example, even when the first electrode plate 114 and the second electrode plate 141 are not in a completely contacting state, the first electrode plate 114 and the second electrode plate 141 may smoothly transfer electromagnetic energy to the display module 110 by applying the AC power with a high frequency component.

A volume of a condenser between the first electrode plate 114 and the second electrode plate 141 is relatively small, and if AC power of high frequency and high voltage is applied to smoothly transmit electromagnetic energy, a phase difference of the voltage and current may occur as the AC power passes from the second electrode plate 141 to the first electrode plate 114. Referring to FIG. 6, the display module 110 according to an embodiment may include an inductor $L_{sr}$ to compensate for the phase difference.

The display module 110 according to an embodiment may further include the variable inductor 115 and the switch 116 to compensate for the phase difference of the voltage and the current, a difference in a condenser volume which may occur when the first electrode plate 114 and the second electrode plate 141 are in contact with each other, a deviation which may occur during the manufacturing process of the inductor $L_{sr}$, a deviation which may occur during the manufacturing process of the display apparatus 100, and the like.

The processor 118 may maintain a resonant state of the display module 110 by changing an inductance of the variable inductor 115.

In an example, the processor 118 provided in the display module 110 may identify the inductance based on a capacitance according to contact between the first electrode plate 114 and the second electrode plate 141. For example, the processor 118 may identify the inductance so that only a resistance component exists due to a load component such as the LED array 111 by maintaining the display module 110 at a resonant state. Then, the processor 118 may change the inductance of the variable inductor 115 to correspond to the identified inductance by controlling the switch 116 on and off.

Referring to FIG. 6, the variable inductor 115 may be a transformer including an inductor $L_{var\_p}$ and an inductor $L_{var\_s}$. The processor 118 may turn on the switch 116 and short a secondary end of the transformer. In this case, the inductance of $L_{var\_p}$ becomes 0. In another example, the processor 118 may open the secondary end of the transformer by turning off the switch 116. In this case, the inductance of $L_{var\_p}$ may be maintained. The processor 118 may change the inductance of $L_{var\_p}$ by alternating the on/off of the switch 116 according to a predetermined duty ratio.

The display module 110 may maintain the resonant state based on the inductance of the changed $L_{var\_p}$, the inductance of the $L_{sr}$, and the capacitance of the condenser.

Referring to FIG. 6, if it is assumed that there is no current flowing in an inductor Lm and the transformer included in the circuit is a transformer of 1:1 or more for convenience of description, the resonant frequency $f_0$ may be represented by Equation 1 as follows.

$$f_0 = \frac{1}{2*\pi*\sqrt{(L_{sr}+L_{var_p})*(C_{pr}//C_{sr+}//C_{sr-})}} \quad \text{[Equation 1]}$$

wherein, $L_{var\_p}$ is an inductance of the variable inductor, $L_{sr}$ is an inductance of a compensation coil, Cpr is a capacitance of the condenser included in the external apparatus 200, Csr+ is a capacitance based on a contact of the positive electrode plate included in each of the first electrode plate and the second electrode plate, and Csr− is a capacitance based on a contact of the negative electrode plate included in each of the first electrode plate and the second electrode plate.

The Cpr may be the condenser included in the external apparatus 200, and the corresponding condenser may block DC power.

A resonance point may be maintained by adjusting the inductance of the $L_{var\_p}$, even if a deviation occurs between the capacitance of the condenser and the compensation coil $L_{sr}$.

According to an embodiment, each of the plurality of display modules 110 may have an independent load, and may adjust the inductance of the variable inductor 115 for the corresponding display module to maintain the resonant state of the corresponding display module and the load is made to appear as a pure resistance component.

The detailed description thereof will be provided below with reference to FIG. 7.

Figure 7:
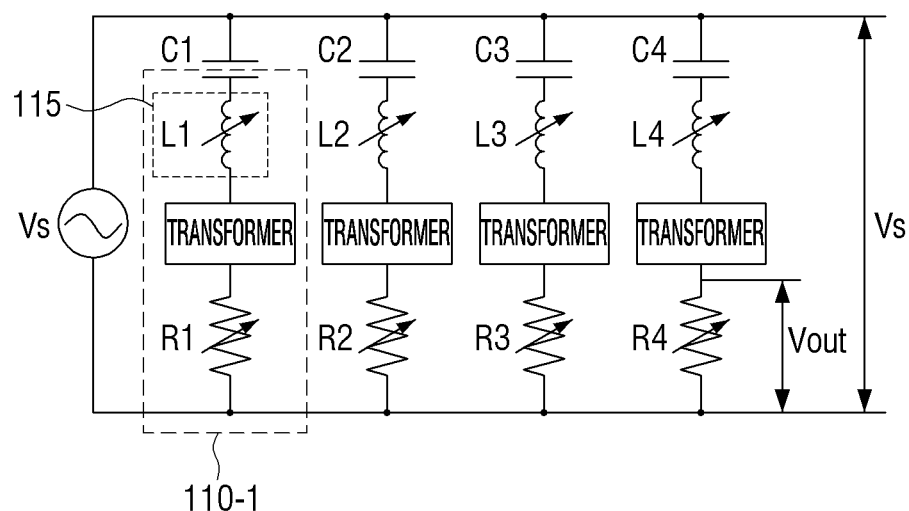
FIG. 7 is a diagram illustrating a variable inductor of a display module according to an embodiment of the disclosure.

FIG. 7 is a diagram illustrating a variable inductor of a display module according to an embodiment of the disclosure.

The processor 118 according to an embodiment may not view the load of the first display module 110-1 as a pure resistance component due to a capacitance C1 (or a capacitance of the condenser) resulting from the contact between the first electrode plate 114 provided on the first display module 110-1 and the second electrode plate 141 provided on the supply module 140. The processor 118 may adjust an inductance L1 of the variable inductor 115 so that the load of the first display module 110-1 may be viewed as a pure resistance component.

Referring to FIG. 7, a case of one inverter driving independent loads R1 to R4 at a fixed frequency may be assumed. Each of the plurality of modules 110 according to an embodiment may maintain the resonant state by independently adjusting the inductance of the variable inductor 115. For example, the inductance L1 of the variable inductor 115 provided in the first display module 110-1 and an inductance L2 of the variable inductor 115 provided in a second display module 110-2 may vary according to capacitance C1 and capacitance C2, respectively.

Figure 8:
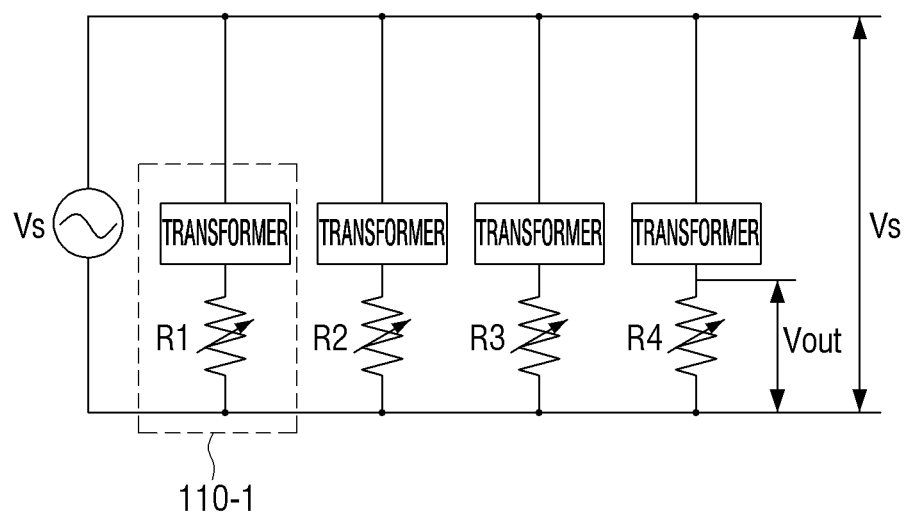
FIG. 8 is a diagram illustrating a resonant state of a display module according to an embodiment of the disclosure.

FIG. 8 is a diagram illustrating a resonant state of a display module according to an embodiment of the disclosure.

Referring to FIG. 8, the inductance of the variable inductor 115 provided on each of the plurality of display modules 110 may be different from one another. In addition, each of the plurality of display modules 110 may maintain the resonant state by independently adjusting the inductance of the variable inductor 115.

The display apparatus 100 according to various embodiments may be enlarged by using the plurality of display modules 110, and power may be wirelessly transmitted to each of the plurality of display modules 110.

In addition, because the enlarged display apparatus 100 may be connected to the external apparatus 200 which provides a data signal and power to the display apparatus 100 via a very thin line, the enlarged display apparatus 100 improves over the related art display apparatuses from a perspective of an interior design.

The display apparatus 100 according to an embodiment may provide a data signal wirelessly to each of the plurality of display modules 110.

Referring back to FIG. 4, the processor 118 according to an embodiment may control the luminescence of a plurality of LED elements included in the LED array 111 based on an optical signal received through the optical signal receiver 112. The optical signal receiver 112 may be implemented as a light sensor or the like, which is capable of detecting an optical signal, but the embodiment is not necessarily limited thereto, and may be implemented as a sensor of various types which may detect the optical signal.

In addition, the processor 118 may control the optical signal transmitter 113 to transmit an optical signal corresponding to the received optical signal externally. The optical signal transmitter 113 may be implemented as a light emitting element of various types capable of transmitting light of a predetermined level based on the control of the processor 118.

Referring to FIG. 4, the display module 110 has been illustrated with an example of including three optical signal receivers 112 and three optical signal transmitters 113. Each of the three optical signal receivers 112 may receive an R optical signal, a G optical signal, and a B optical signal, and each of the three optical signal transmitters 113 may transmit the R optical signal, the G optical signal, and the B optical signal. However, this is merely an example and the embodiment is not limited thereto. For example, the display module 110 may also include one optical signal receiver 112 and one optical signal transmitter 113. The processor 118 may control the luminescence of the plurality of LED elements included in the LED array 111 based on a single optical signal received through the optical signal receiver 112, and control the optical signal transmitter 113 to transmit the signal optical signal corresponding to the received optical signal. In another example, the display module 110 may also include four or more optical signal receivers 112 and four or more optical signal transmitters 113. The number of optical signal receivers 112 and the number of optical signal transmitters 113 included in the display module 110 may not necessarily be the same.

According to an embodiment, the position and the number of a first hole provided at a first side of the support frame for the optical signal receiver 112 to receive the optical signal without being blocked may correspond to the position and the number of the optical signal receiver 112 provided on a driving substrate, respectively. In addition, the position and the number of a second hole provided at a second side (e.g., opposite to the first side) of the support frame for the optical signal transmitter 113 to transmit the optical signal without being blocked may correspond to the position and the number of optical signal transmitters 113 provided on the driving substrate, respectively.

The plurality of display modules 110 according to an embodiment may be disposed in a matrix form. Referring back to FIG. 1, the frame 120 according to an embodiment may include the plurality of areas 121 in a 4×5 matrix form, and each of the display modules 110 may be mounted and fixed at each of the plurality of areas 121. The number, the size, or the like of the plurality of areas 121 provided in the frame 120 may be variously modified according to the size, or the like of the display apparatus 100.

The plurality of display modules 110 disposed in the matrix form may be divided into a plurality of display groups. For example, referring to FIG. 1, the plurality of display modules of a 4×1 form disposed in the same column may be one display group. That is, the plurality of modules illustrated in FIG. 1 may be divided into five display groups, each display group corresponding to each column of the 4×5 matrix form.

However, this is merely one example and the embodiment is not limited thereto. For example, referring to FIG. 1, the plurality of display modules in a 1×5 matrix form disposed in the same row may be one display group. That is, the plurality of display modules 110 illustrated in FIG. 1 may be divided into four display groups, each display group corresponding to each row of the 4×5 matrix form.

The plurality of display modules 110 according to an embodiment may be connected in a display group unit and transmit and receive data. For example, the plurality of display modules 110 included in the display group may be connected via daisy chain method. The daisy chain method, which is a method of connecting the plurality of display modules 110 in the display group in series, may be a method in which the display module that has received data from the external apparatus 200 may transmit the received data to another display module which is connected to the display module in series such that the data is to be sequentially transmitted to all of the plurality of display modules.

Referring to FIG. 1, in the plurality of display modules 110 in the 4×1 matrix form is one display group, the first display module 110-1 positioned at the lower-most end of the plurality of display modules in one display group may transmit data to a second display module 110-2 in the same display group, and the data may be sequentially transmitted to a third display module 110-3 and a fourth display module 110-4.

The related art display apparatuses interconnect the plurality of display modules by using numerous connecting cables to transmit power and/or data to each of the plurality of display modules. For example, the related art daisy chain method involves the plurality of display modules in the display group being interconnected through cables, and the display module transmits data to another display module that is connected with the display module in series through the cable. Because the related art display apparatuses use numerous connecting cables to interconnect the plurality of display modules, there are disadvantages that the manufacturing and assembly process of the display apparatus is complex, a unit cost of producing the display apparatus increases, and a yield reduces. The display apparatus 100 according to an embodiment may transmit data to each of the plurality of display modules 110 through a via hole provided on the frame 120, which is not a cable, and therefore solve the problems in the related art mentioned above.

According to an embodiment, each of the plurality of areas 121 provided in the frame 120 may include at least one first hole 122 provided at first side of the area 121 and at least one second hole 123 provided at a second side of the area 121 facing the first side.

According to an embodiment, the position and the number of the optical signal receivers 112 provided in the display module 110 may correspond to the position and the number of the first holes 122 provided in the area 121, and the position and the number of the optical signal transmitters 113 provided in the display module 110 may correspond to the position and the number of the second holes 123 in the area 121.

According to an embodiment, the first display module 110-1 of the plurality of display modules 110 may receive light, transmitted from the light transmitting module 130 through the optical signal receiver 112 via the first hole 122, and transmit the received light to the adjacent second display module 110-2 through the optical signal transmitter 113 via the second hole 123. The first display module 110-1 may refer to the display module disposed at the lower-most end in each of the plurality of display groups. The first display module 110-1 disposed at the lower-most end in each display group according to an embodiment may receive light transmitted from the light transmitting module 130.

The display apparatus 100 according to an embodiment may include the light transmitting module 130, which is provided at one side of the frame 120, and converts the signal received from the external apparatus 200 to an optical signal and transmits to the first display module 110-1 of each display group of the plurality of display modules 110.

The external apparatus 200 may be an apparatus which provides video data to the display apparatus 100 including the plurality of display modules 110. Specifically, the external apparatus 200 may be implemented as an image processing apparatus which provides video data obtained by processing input video content and control data for displaying the corresponding vide data to the display apparatus 100. The video data may be data related to an image signal including red (R), green (G), and blue (B) pixel information, and the like. In addition, the control data may be data related to a control command signal for controlling a state of the display module, and may include information of the display module including at least one of, for example, a contrast information, a brightness information, information on a state of arrangement or information on whether power is on or off. For example, the external apparatus 200 may be implemented as a device which processes input data and transmits to the display apparatus 100 such as, for example, and without limitation, a source box, a control box, a sending box, a set-top box, or the like. In addition, the external apparatus 200 may be implemented as a device which receives external power and converts to an alternating signal with a plus (+) minus (−) differential component of a frequency (e.g., 200 kHz) higher than the commercial use alternating current power (e.g., 50/60 Hz), and provides alternating signals to the power supply module 140 which is mounted to the back surface of the display apparatus 100 via thin lines. In the disclosure, an electromagnetic wave component resulting from the high frequency alternating signals is transmitted as a differential component to offset each other.

The light transmitting module 130 according to an embodiment may convert the control data or the signal received from the external apparatus 200 to an optical signal and transmit the optical signal.

For example, the light transmitting module 130 may transmit the optical signal to the first display module 110-1 through the first hole 122 of the area 121, that is an area to which the first display module 110-1 is mounted, provided at the lower-most end of the frame 120. The first hole 122 may be a via hole through which the optical signal transmitted by the light transmitting module 130 may pass and reach the optical signal receiver 112 provided in the first display module 110-1 without being blocked (or without any loss). The light transmitting module 130 may include at least one light emitting element to correspond to each of the number and the area of the first hole 122 in the area 121 provided at the lower-most end of the frame 120.

The light transmitting module 130 according to an embodiment may transmit the optical signal to the first display module 110-1 disposed at the lower-most end of each of the plurality of display groups in order to transmit the optical signal to each of the plurality of display groups. For convenience of description, FIG. 1 illustrates the light transmitting module 130 spaced apart from the frame 120, but the light transmitting module 130 may be provided at one side of the frame 120 to connect with the frame 120.

The second display module 110-2 may receive the light transmitted from the first display module 110-1 through the optical signal receiver 112 via the first hole 122 of the area 121 corresponding to the second display module 110-2, and transmit the received light to an adjacent third display module 110-3 through the optical signal transmitter 113 via the second hole of the area 121 corresponding to the second display module 110-2. The optical signal may then be sequentially transmitted to the third to an n-th display modules 110-3, . . . , 110-n within the display group.

The first to the n-th display modules 110-1, . . . , 110-n may belong to a display group divided according to a row or a column, that is, the first to the n-th display modules 110-1, . . . , 110-n may be disposed in the same row or the same column.

The detailed description on the at least one first hole 122 provided at a first side of each of the plurality of areas 121 and the at least one second hole 123 provided at a second side facing the first side according to an embodiment will be described in detail with reference to FIG. 9.

Figure 9:
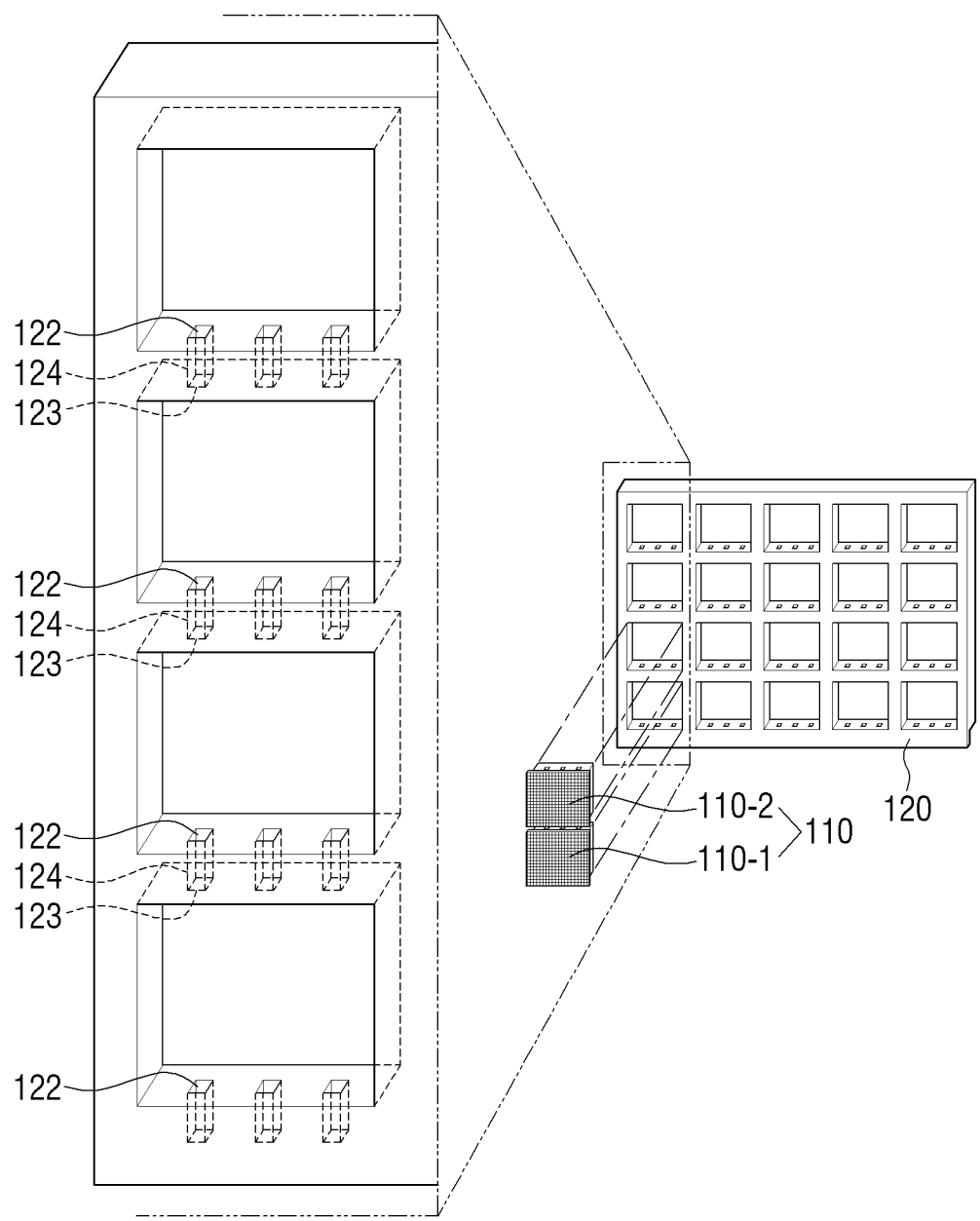
FIG. 9 is a diagram illustrating a frame of a display apparatus according to an embodiment of the disclosure.

FIG. 9 is a diagram illustrating a frame according to an embodiment of the disclosure.

Referring to FIG. 9, the plurality of display modules 110 may be disposed in a matrix form, and the plurality of display modules 110 may be divided into a plurality of display groups.

For example, the plurality of display modules 110 may be disposed in a 4×5 matrix form, and divided into five display groups, each display group being in a 4×1 matrix form (that is, four rows and one column). For example, the first to fourth display modules 110-1, 110-2, . . . , 110-4, in a 4×1 matrix form may be included in a first display group among the five display groups.

The area 121 to which each of the first to fourth display modules 110-1, . . . , 110-4 are mounted may include the first hole 122 at a first side (e.g., a lower side) of the area 121 and the second hole 123 at a second side (e.g., an upper side) of the area 121 facing the first side. The frame 120 may further include a light guide hole 124 between the second hole 123 of the area 121 to which a lower display module (e.g., the first display module 110-1) is mounted and the first hole 122 of the area 121 to which an upper adjacent display module (e.g., the second display module 110-2) is mounted. The light guide hole 124 passes through an area of the frame 120. That is, the second hole 123 of the area 121 provided corresponding to the lower display module and the first hole 122 of the area 121 provided corresponding to the adjacent upper display module may be connected through the light guide hole 124. The number and the position of the first hole 122 and the number and the position of the second hole 123 illustrated in FIG. 9 have been arbitrarily selected for illustratively purposes, and the embodiment is not limited thereto.

According to an embodiment, the light transmitting module 130 may convert the signal (e.g., video data) received from the external apparatus 200 to an optical signal. The light transmitting module 130 may then transmit the optical signal to the frame 120 through the first hole 122 of the area 121 to which the first display module 110-1 located at the lower-most end in the display group is mounted.

The optical signal transmitted by the light transmitting module 130 may be transmitted to the optical signal receiver 112 provided in the first display module 110-1 through the first hole 122, and the first display module 110-1 may control the luminescence of the light emitting elements included in the LED array 111 based on the received optical signal. The first display module 110-1 may then transmit the light corresponding to the received optical signal through the optical signal transmitter 113 to the adjacent display module 110-2.

According to an embodiment, the light transmitted by the first display module 110-1 may pass through the first hole 122 provided on the area 121 to which the second display module 110-2 is mounted via the second hole 123 provided at the area 121 to which the first display module 110-1 is mounted. The light transmitted by the first display module 110-1 passes through the light guide hole 124 which passes through an area of the frame between the second hole 123 corresponding to the first display module 110-1 and the first hole 122 corresponding to the second display module 110-2. The light guide hole 124 may refer to a via hole through which optical signals are transmitted and received instead of using the cable (e.g., optical cable) for connecting the first display module 110-1 and the second display module 110-2, as in the related art.

According to an embodiment, the second display module 110-2 may receive light through the first hole 122 provided on the area 121 to which the second display module 110-2 is mounted, transmit light corresponding to the light received through the optical signal transmitter 113 provided in the second display module 110-2. The light transmitted by the second display module 110-2 may be transmitted to the third display module 110-3, and the third display module 110-3 may transmit the light corresponding to the received light to the fourth display module 110-4. The light corresponding to the received light may be the same light as the received light.

For convenience of description, an example embodiment in which the display module transmits an optical signal to a display module that is vertically adjacent to the display module has been described, but the embodiment is not limited thereto. In an example, the display module 110 may also transmit an optical signal to a display module that is horizontally adjacent to the display module.

The display apparatus 100 according to various embodiments may transmit and receive the optical signal between the plurality of display modules 110 through the light guide hole 124 passing through an area in the frame, which substitutes the cable in the relate art.

When each of the plurality of display modules 110 is mounted to the area 121 provided in the frame 120, the area 121 provided in the frame 120 becomes shielded, and thus the light transmitted by the display module 110 may arrive at the other display module without interference by an external light.

The display apparatus 100 according to an embodiment may be implemented to provide only power in a wireless manner, and provide a data signal in a wired manner to each display module 110. For example, each of the plurality of display modules 110 included in the display apparatus according to an embodiment may be interconnected with adjacent display modules by a wired cable to transmit and receive data signals, and/or may output an image based on the data signal received from the adjacent display modules.

Figure 10:
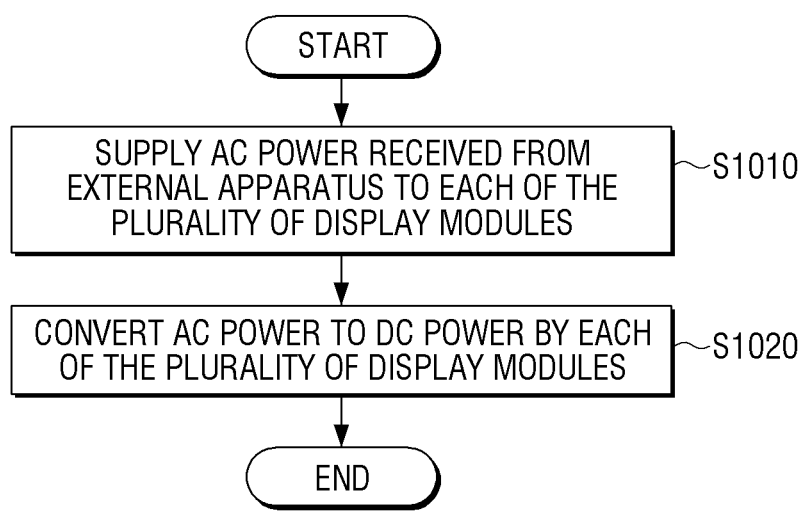
FIG. 10 is a flowchart illustrating a method of controlling a display apparatus according to an embodiment of the disclosure.

FIG. 10 is a flowchart illustrating a method of controlling a display apparatus according to an embodiment of the disclosure.

A method according to an embodiment controls a display apparatus which comprises a frame, a plurality of display modules, and a power supply module. The frame includes a plurality of areas to which the plurality of display modules are mounted, and each of the plurality of display modules includes a first electrode plate provided at a back surface of each of the plurality of display modules. The power supply module includes a second electrode plate disposed at a back surface of the frame and disposed to be adjacent to the first electrode plate. The method according to an embodiment provides an AC power received from the external apparatus to each of the plurality of display modules (S1010). Then, each of the plurality of display modules may convert the AC power to a DC power (S1020).

Each of the plurality of display modules may include a variable inductor and a switch connected to the variable inductor. The control method according to an embodiment may include identifying an inductance based on a capacitance according to contact between the first electrode plate and the second electrode plate and controlling the on/off of the switch for the variable inductor to include the identified inductance.

In addition, the first electrode plate may include a first positive electrode plate and a first negative electrode pate, and the second electrode plate may include a second positive electrode plate which contacts the first positive electrode plate and a second negative electrode plate which contacts the first negative electrode plate.

The power supply module according to an embodiment may be provided in a size corresponding to the size of the frame.

The display apparatus according to an embodiment may include a light transmitting module which is provided at one side of the frame and converts the signal received from the external apparatus to an optical signal and transmits the optical signal to a plurality of display modules. The display apparatus according to an embodiment may further include a frame, and a plurality of areas to which the plurality of display modules are mounted to a plurality of areas of the frame. Each of the plurality of areas may include at least one first hole provided at a first side of an area and at least one second hole provided at a second side of the area facing the first side, and each of the plurality of display modules may include an optical signal receiver provided at a position corresponding to the first hole and an optical signal transmitter provided at a position corresponding to the second hole.

The control method according to an embodiment may include receiving, at a display module, light transmitted from the light transmitting module by an adjacent display module of the plurality of display modules through an optical signal receiver via the first hole and transmitting the received light to another adjacent display module through the optical signal transmitter via the second hole.

The light transmitting module may be connected to one side of the power supply module.

In addition, the first display module and the second display module may be disposed at the same row or the same column, and the control method according to an embodiment may include receiving light transmitted from the first display module by the optical signal receiver of the second display module via the first hole and transmitting the received light to the third display module that is adjacent to the second display module by the optical signal transmitter of the second display module via the second hole. The third display module may be disposed in the same row or the same column as the first display module and the second display module.

The frame according to an embodiment may further include a light guide hole which passes through an area of the frame between the second hole provided in the first display module and the first hole provided in the second display module, and the transmitting light from the first display module to the second display module may include transmitting light from the first display module to the second display module through the light guide hole.

In addition, the plurality of display modules may be divided into a plurality of display groups, and the plurality of display modules included in each of the plurality of display groups may be interconnected through a plurality of light guide holes, and the control method according to an embodiment may include receiving a plurality of optical signals, which are transmitted from the light transmitting module, at each of the plurality of display groups through the plurality of light guide holes provided between the plurality of display groups and the light transmitting module.

Each of the plurality of display modules according to an embodiment may be interconnected via a cable to transmit the signal received from the external apparatus to the adjacent display module.

Various embodiments of the disclosure may be applicable to not only a display apparatus, but also to an electronic apparatus of all types which include a power supply.

Various embodiments described above may be implemented in a recordable medium which is readable by a computer or a related device of a computer using software, hardware, or the combination of software and hardware. In some cases, embodiments described herein may be implemented by a processor itself. According to a software implementation, embodiments such as the procedures and functions described herein may be implemented with separate software modules. Each of the above-described software modules may perform one or more of the functions and operations described herein.

The computer instructions for performing operations in the display apparatus 100 (or an electronic apparatus) according to various embodiments described above may be stored in a non-transitory computer-readable medium. The computer instructions stored in the non-transitory computer-readable medium may be executed by a processor, a computer, or a related device to perform the above-described operations in the display apparatus 100 according to various embodiments.

The non-transitory computer readable medium refers to a medium that stores data semi-permanently rather than storing data for a very short time, such as a register, a cache, a memory, or the like, and is readable by an apparatus. Specific examples of the non-transitory computer readable medium include, for example, and without limitation, a compact disc (CD), a digital versatile disc (DVD), a hard disc, a Blu-ray disc, a universal serial bus (USB), a memory card, a read only memory (ROM), and the like.

According to various embodiments, a display apparatus may be enlarged by using a plurality of display modules while at least one of a data signal or power may be wirelessly transmitted to each of the plurality of display modules, thereby avoiding problems in the related art such as a reduced yield, increased defects, and the like in a process of manufacturing and assembling the modular display apparatus.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing operations may employ any number of related art techniques for electronics configuration, signal processing and/or control, data processing and the like.

While the disclosure has been illustrated and described with reference to various example embodiments thereof, the disclosure is not limited to the specific embodiments described. It will be understood by those skilled in the art that various changes in form and details may be made therein without departing from the spirit and scope of the disclosure.

What is claimed is:

1. A display apparatus comprising:
   a plurality of display modules, each display module of the plurality of display modules comprising a first electrode plate provided on a back surface of the display module;
   a frame comprising a plurality of areas to which the plurality of display modules are respectively mounted;
   a power supply module comprising a second electrode plate, the second electrode plate being disposed on a back surface of the frame and adjacent to the first electrode plate,
   wherein the power supply module is configured to provide an alternating current (AC) power received from an external apparatus to each display module of the plurality of display modules, and wherein each display module of the plurality of display modules is configured to convert the AC power to a direct current (DC) power.

2. The display apparatus of claim 1, wherein each display module of the plurality of display modules further comprises:
a variable inductor;
a switch connected to the variable inductor; and
a processor configured to control an on state and an off state of the switch to adjust an inductance of the variable inductor based on a capacitance caused by a contact between the first electrode plate and the second electrode plate.

3. The display apparatus of claim 1, wherein the first electrode plate comprises a first positive electrode plate and a first negative electrode plate,
wherein the second electrode plate comprises a second positive electrode plate and a second negative electrode plate, and
wherein the second positive electrode plate contacts the first positive electrode plate and the second negative electrode plate contacts the first negative electrode plate.

4. The display apparatus of claim 1, wherein the power supply module has a size corresponding to a size of the frame.

5. The display apparatus of claim 1, further comprising:
a light transmitting module configured to convert a signal received from the external apparatus to an optical signal and transmits the optical signal to the plurality of display modules,
wherein each area of the plurality of areas comprises at least one first hole provided on a first side and at least one second hole provided on a second side facing the first side.

6. The display apparatus of claim 5, wherein each display module of the plurality of display modules comprises an optical signal receiver provided at a position corresponding to the at least one first hole and an optical signal transmitter provided at a position corresponding to the at least one second hole, and
wherein a first display module of the plurality of display modules is configured to, based on receiving light transmitted from the light transmitting module through the optical signal receiver via the at least one first hole, transmit the received light to a second display module through the optical signal transmitter via the at least one second hole, the second display module being adjacent to the first display module.

7. The display apparatus of claim 5, wherein the plurality of display modules are arranged in a matrix, the plurality of display modules comprising a first display module, a second display module, and a third display module disposed adjacent to one another in a same row or a same column in the matrix, and
wherein the second display module is configured to, based on receiving light, transmitted from the first display module via the at least one first hole, transmit the received light to the third display module via the at least one second hole.

8. The display apparatus of claim 7, wherein the frame further comprises:
a light guide hole passing through an area of the frame between the at least one second hole provided in an area of the frame corresponding to the first display module and the at least one first hole provided in an area of the frame corresponding to the second display module, and wherein the second display module is further configured to receive the light transmitted from the first display module through the light guide hole.

9. The display apparatus of claim 1, wherein the plurality of display modules are divided into a plurality of display groups, and
wherein display modules included in a same display group are interconnected to each other through a light guide hole, and the plurality of display groups are configured to receive a plurality of optical signals from a light transmitting module through a plurality of light guide holes provided between the plurality of display groups and the light transmitting module.

10. The display apparatus of claim 1, wherein the plurality of display modules are interconnected to each other by a cable, and
wherein each display module of the plurality of display modules is further configured to transmit a signal received from the external apparatus to an adjacent display module via the cable.

11. A method of controlling a display apparatus, the display apparatus comprising a plurality of display modules and a power supply module configured to provide power to each display module of the plurality of display modules, the method comprising:
providing, by the power supply module, an alternating current (AC) power received from an external apparatus to each of the plurality of display modules via a first electrode plate provided on a back surface of each display module of the plurality of display modules and a second electrode plate disposed on a back surface of a frame of the display apparatus and adjacent to the first electrode plate, wherein the frame comprises a plurality of areas to which the plurality of display modules are respectively mounted; and
converting, by each of the plurality of display modules, the AC power to a direct current (DC) power.

12. The method of claim 11, wherein each display module of the plurality of display modules comprises a variable inductor, and a switch connected to the variable inductor,
the method further comprising controlling an on state and an off state of the switch such that an inductance of the variable inductor corresponds to a capacitance according to a contact between the first electrode plate and the second electrode plate.

13. The method of claim 11, wherein the first electrode plate comprises a first positive electrode plate and a first negative electrode plate,
wherein the second electrode plate comprises a second positive electrode plate and a second negative electrode plate, and
the second positive electrode plate contacts the first positive electrode plate and the second negative electrode plate contacts the first negative electrode plate.

14. The method of claim 11, wherein the power supply module has a size corresponding to a size of the frame.

15. The method of claim 11, further comprising, converting, by using a light transmitting module of the display apparatus, a signal received from the external apparatus to an optical signal and transmitting the optical signal to the plurality of display modules.

16. The method of claim 15, further comprising:
receiving, by a first display module of the plurality of display modules, light transmitted from the light transmitting module through an optical signal receiver of the first display module via at least one first hole provided on a first side of an area of the frame to which the first display module is mounted; and transmitting, by the first display module, the received light to a second display module, adjacent to the first display module, through an optical signal transmitter of the first display module via at least one second hole provided on a second side of the area of the frame to which the first display module is mounted, the second side facing the first side.

17. The method of claim 15, wherein the plurality of display modules comprises a first display module, a second display module, and a third display module disposed adjacent to one another in a same row or a same column, the method further comprising:

receiving, by the second display module, light transmitted from the first display module via at least one first hole provided on a first side of an area of the frame to which the second display module is mounted; and transmitting, by the second display module, the received light to the third display module via at least one second hole provided on a second side of the area of the frame to which the second display module is mounted, the second side facing the first side.

18. The method of claim 17, wherein the frame further comprises a light guide hole passing through an area of the frame between the at least one second hole provided in an area of the frame corresponding to the second display module and at least one first hole provided in an area of the frame corresponding to the third display module, and wherein the transmitting comprises transmitting the received light to the third display module through the light guide hole.

19. The method of claim 11, wherein the plurality of display modules are divided into a plurality of display groups, and wherein display modules included in a same display group are interconnected to each other through a light guide hole, the method further comprising transmitting a plurality of optical signals from a light transmitting module to the plurality of display groups through a plurality of light guide holes provided between the plurality of display groups and the light transmitting module.

20. The method of claim 11, wherein the plurality of display modules are interconnected to each other by a cable, and wherein each display module of the plurality of display modules is further configured to transmit a signal received from the external apparatus to an adjacent display module via the cable.

* * * * *